(12) United States Patent
Fowler

(10) Patent No.: US 7,628,317 B2
(45) Date of Patent: Dec. 8, 2009

(54) AUTHENTICITY VALIDATION SYSTEM AND METHOD

(75) Inventor: Edward Fowler, Brooklyn, NY (US)

(73) Assignee: Edward S. Fowler, Brooklyn, NY (US)

( * ) Notice: Subject to any disclaimer, the term of this patent is extended or adjusted under 35 U.S.C. 154(b) by 400 days.

(21) Appl. No.: 11/743,514

(22) Filed: May 2, 2007

(65) Prior Publication Data

US 2007/0257098 A1    Nov. 8, 2007

Related U.S. Application Data

(60) Provisional application No. 60/796,730, filed on May 2, 2006.

(51) Int. Cl.
*G06F 17/00* (2006.01)
(52) U.S. Cl. .................. 235/375; 150/145; 206/776
(58) Field of Classification Search ............. 235/375; 150/132, 145; 206/775, 776
See application file for complete search history.

(56) References Cited

U.S. PATENT DOCUMENTS

| | | | | |
|---|---|---|---|---|
| 4,741,372 A | * | 5/1988 | Santilli | 150/137 |
| 5,040,671 A | * | 8/1991 | Hager | 206/39 |
| 6,065,515 A | * | 5/2000 | Harris | 150/132 |
| 2008/0023371 A1 | * | 1/2008 | Macor | 206/775 |

* cited by examiner

*Primary Examiner*—Daniel A Hess
(74) *Attorney, Agent, or Firm*—Lackenbach Siegel, LLP; Myron Greenspan

(57) ABSTRACT

A product authentication system includes a carrier for receiving paper currency. The currency bears a unique serial number. The carrier is attached to a product the authenticity of which may need to be verified. The carrier can serve as a hang tag attached to various products, such as designer clothing, shoes, or watches. The carrier is preferably fully transparent to expose the currency embedded within it and to expose the unique serial number. A verification system allows a user, such as a consumer, to enter alphanumeric characters representing the serial number of the currency and includes a data base containing an inventory of serial numbers representing legitimate products to which carriers with unique articles of currency have been attached. The alphanumeric characters are compared with the serial numbers contained in the data base and an output is provided for indicating the authenticity of a product only when the entered alphanumeric characters correspond to a serial number stored in the data base. Data entry may be performed at a consumer station that includes a keyboard and may be a stand alone unit or may include communications for linking the consumer station to at least one remote authentication center that may service numerous consumer stations over any suitable communication link, as such as the Internet. The consumer station may be in the form of a kiosk or may be a portable hand-held device with Internet access. Preferably, the carrier further incorporates a security tag for providing both anti-theft and authentication features.

20 Claims, 4 Drawing Sheets

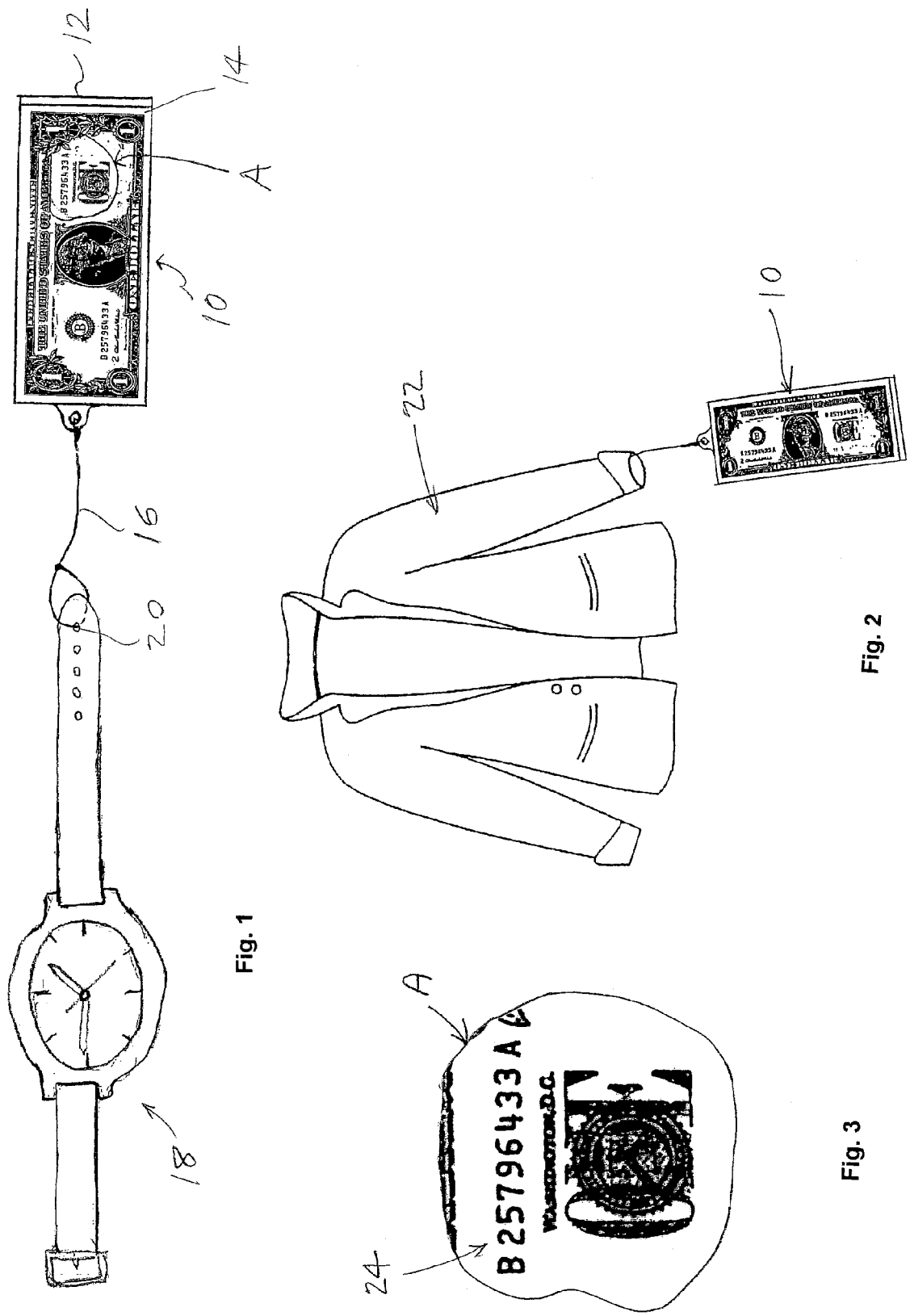

US 7,628,317 B2

AUTHENTICITY VALIDATION SYSTEM AND METHOD

CROSS REFERENCE TO RELATED APPLICATION

This application is related and claims the benefit of Provisional Patent Application Ser. No. 60/796,730 filed on May 2, 2006.

BACKGROUND OF THE INVENTION

1. Field of the Invention

This invention generally relates to verification systems and methods, and more specifically to an authenticity validation system and method for validating the authenticity of primarily high-ticket items.

2. Description of the Invention

In this age of heavy promotion and advertising of many goods, including in particular designer clothing and expensive jewelry and watches, there is widespread counterfeiting of those high-ticket items that typically bear famous names or trademarks. Companies that produce and heavily promote such high-ticket items, including designer clothing and handbag companies, for example, lose millions of dollars each year from the sale of counterfeit merchandise, commonly referred to as "knock-offs." Despite trademark and anti-counterfeiting laws passed against it, knock-offs continue to be produced and sold both to those who simply want to purchase lower-priced imitations of a legitimate or authentic product or to those individuals who purchase imitations under the misapprehension that they are original or bona fide products. Particularly in the latter cases, purchasers can be duped into paying significantly more money for a counterfeit product than a "knock-off" or imitation is worth. To date, there is no known system that exists that empowers a consumer to reliably check the authenticity of a high-priced ticket item. This has presented problems to consumers as some of the knock-offs are very difficult to distinguish or tell apart from the authentic or legitimate items.

SUMMARY OF THE INVENTION

Accordingly, it is an object of the invention to provide an authenticity validation system and method which do not suffer from the disadvantages inherent in prior art systems and methods.

It is another object of the invention to provide such system and method as in the previous object which make it virtually impossible for a producer of knock-offs to counterfeit the product together with the labels or hang tags in accordance with the invention.

It is still another object of the invention to provide a validation system and method as in the previous objects which is simple and convenient to use.

It is yet another object of the invention to provide a validation system and method of the type under discussion that can be used by a consumer both at retail establishments or points of sale as well as after the product has been brought home and authenticity can be checked in virtually any place where a user has access to a computer terminal or handheld computer (i.e. PDA, PocketPC, cell phone) connectable to the Internet.

It is an additional object of the invention to provide a validation system and method that is combined with a security tag to provide both anti-theft and product authenticity verification functions.

It is still an additional object to provide a security tag with means for verifying the authenticity of a product to which the tag is attached.

It is yet an additional object of the invention to provide a validation system and method that uses unique Treasury Note serial numbers within hang tags and/or security tags that cannot be copied or duplicated without immediately violating federal counterfeiting statutes, thus creating extremely strong incentives against duplicating high ticket products to which such tags are attached.

The objects of the invention, therefore, are to provide the consumer with a means of validating the authenticity of an article of clothing or the like, typically high-priced ticket items, by checking a distinguishable, non-counterfeited characteristic of a federal reserve note such as a currency bill, that is stitched or otherwise incorporated or attached to a product.

It is an additional object of the invention to provide the consumer with the means of validating the authenticity of an article of clothing or the like by checking the serial number on a federal reserve note or currency bill that is stitched into or otherwise attached an item of clothing against a database of serial numbers that is publicly accessible via the legitimate company's website or the website of a central authentication center.

It is yet an additional object of the invention to provide an economical system and method for validating the authenticity of an article of clothing or the like whereby the cost of stitching a federal reserve note on an article of clothing, such as a one dollar bill (which is the monetary equivalence of the smallest federal reserve note) is reflected in an increased price of the clothing, but it can be refunded to the customer by means of removing the treasury note from the article of clothing.

BRIEF DESCRIPTION OF THE DRAWINGS

Various further objects, features and advantages under present invention will be more fully appreciated as the invention will be better understood in light of the accompanying figures, in which:

FIG. 1 is a schematic representation of a product in the form of a watch which a manufacturer does not wish to be counterfeited, attached to a hang tag incorporating the present invention;

FIG. 2 is similar to FIG. 1 but showing the hang tag in accordance with the present invention attached to an item of clothing;

FIG. 3 is an enlarged area "A" of the currency bill shown in FIG. 1, illustrating the serial number of the currency bill;

DESCRIPTION OF THE PREFERRED EMBODIMENTS

Figure 4:
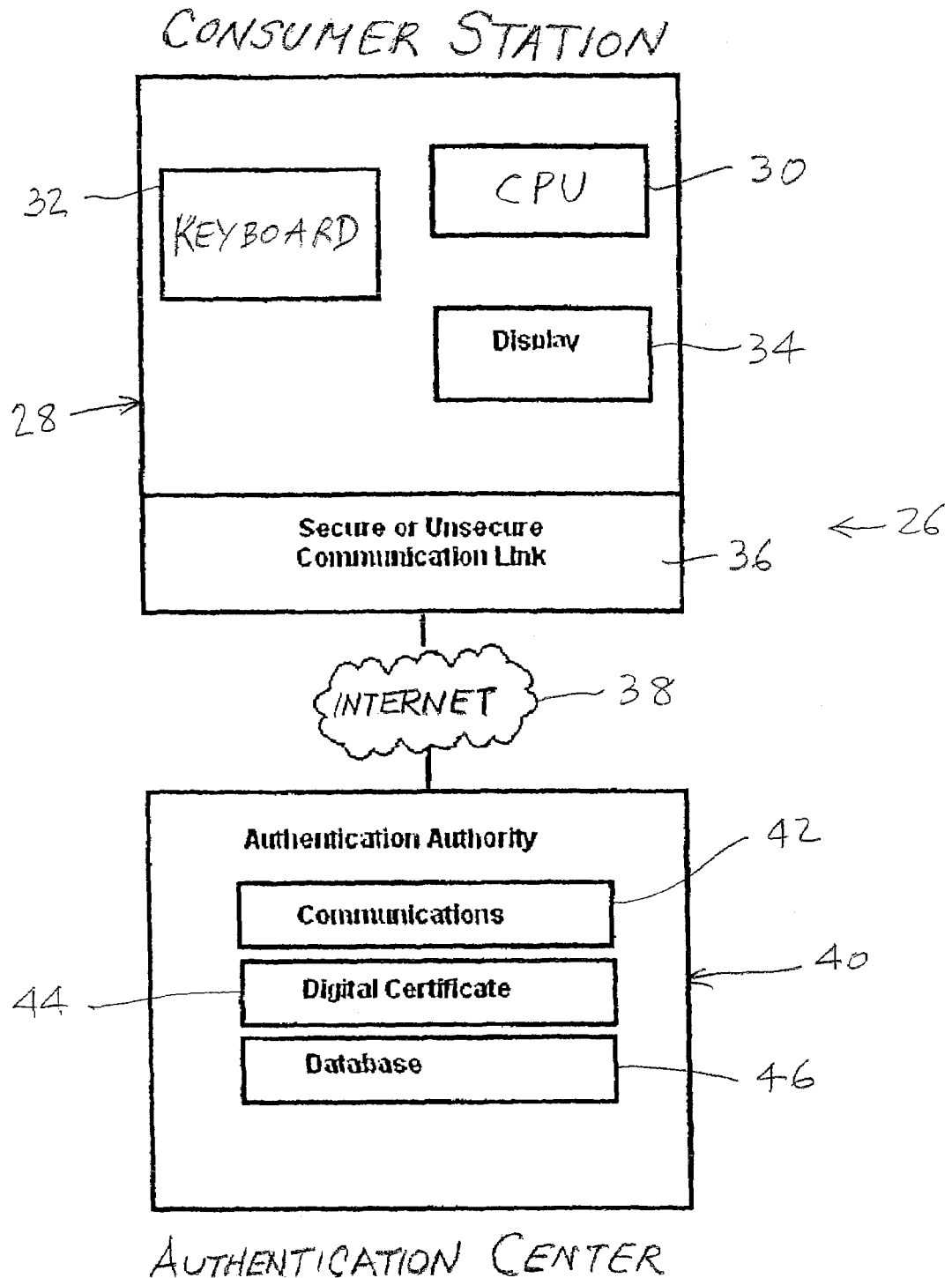
FIG. 4 is a diagrammatic representation of a system that can be used to practice the method of the present invention utilizing the hang tags or the like shown in FIGS. 1 and 2.

Referring now to the figures, in which identical or similar parts are designated by the same reference numerals throughout, and first referring to FIG. 1, an important feature of the present invention is generally designated by the reference numeral 10.

In the embodiment shown in FIG. 1, the reference numeral 10 represents a hang tag formed of a preferably sealed transparent pouch 12 dimensioned to receive a bank note or, as shown, a Federal reserve note in the form of a one dollar bill 14. It will be clear that any item of currency can be used for this purpose. The bill 14 may be any denomination or amount or can even represent currency from another country. For use in the United States, however, it is preferred that U.S. currency be used, although local currency can be used for each country where the goods are to be sold. After the currency bill 14 is inserted in a transparent pouch or envelope 12 it is preferably sealed so that the currency bill cannot be removed until a sales transaction has taken place and has been completed.

The hang tag 10 is secured by means of a tie or filament 16 to a product 18, in this case a well known popular brand watch, of which replicas may be frequently sold. A loop formed at the free end of the tie 16 is secured through a hole or opening in a strap of the watch. Clearly, the manner in which the currency bill 14 is attached or associated to the product is not critical for purposes of the present invention, and as will be made more evident hereafter, other forms of attachment are possible. In FIG. 2, the same pouch containing a currency bill is shown attached to a garment 22, typically a well known designer brand.

An important feature of the invention is that an official government reserve note or currency bill be incorporated into the hang tag so that it becomes apart of the hang tag. As will be appreciated, counterfeiting of currency of any country is an extremely serious crime and punishable by imprisonment or fine or both. For example, counterfeiting of U.S. currency entails severe criminal penalties under, for example, Title 18, Chapter 25 of the U.S. Code. Accordingly, the duplication or reproduction of any currency bill is not likely to be reproduced by a counterfeiter of a product.

As is well known, the bank notes and currency bills, in every denomination, are assigned unique serial numbers, as shown in FIGS. 1 and 3. There is only one dollar currency bill, for example, that has the serial number "B 25796433 A." Because of the unique character of such serial numbers they can be used in conjunction with the present invention to verify or confirm the authenticity of a legitimate product. The manufacturer of the product attaches a currency bill as described previously. The serial numbers of all of the currency bills thus used are entered into a database which can be accessed to effectuate the method of the invention.

Referring to FIG. 4, a diagrammatic illustration of a system is shown generally represented by reference numeral 26. The system 26 is similar, for example, to other systems, such as the one disclosed in U.S. published patent application 2005/0289061 A1, the contents of which are incorporated herewith.

In the system 26, the reference numeral 28 represents a consumer station. Such station may be a terminal in a retail establishment where the product or products to be verified are sold. The consumer station 28 may be provided at the point of sale. However, it will be evident to those skilled in the art that a consumer station 28 can also be a personal computer (i.e. PDA, PocketPC, cell phone) that has access to the Internet or other available communications link (e.g. telephone connection) so that verification can also be made before or after the product is purchased and brought home.

The consumer station 28 generally includes a CPU and a keyboard 32. A display 34 is preferably provided so that a consumer can check information during data entry and make certain for example, that the serial numbers entered on the keyboard are the correct ones. The consumer station 28 also includes a secure or unsecure communication link 36 of the type commonly used in connection with computer terminals, which communicates through any suitable network, such as the Internet 38. The communication link 36 can be preprogrammed to access an authentication center 40 automatically when requested by a consumer to verify the authenticity of a product by programming the "address" of the authentication enter.

The authentication center 40 includes communications hardware and software preferably enabling communication with a plurality of consumer stations 28 over the Internet 38 or other communication link. A digital certificate 48 may be used to validate the consumer station 28 and to make certain that the information that is being received by the authentication center is coming from a legitimate or authorized source. The database 46 at the authentication center is the location where all of the serial numbers on the currency bills attached to products are entered. It is pointed out, in this connection, that the authentication center may be one established by a given manufacturer to authenticate its own product or products or it can also be a collective authentication center, such as a central service bureau, that performs this service for more than one manufacturer, in which case all of the manufacturers that participate or cooperate with the authentication center 40 would need to periodically provide serial numbers of all currency bills attached to their products that the database can be regularly updated. Also, the data base is also preferably updated when legitimate tagged products are sold that the serial numbers of currency bills attached to those products are removed from the data base and the data base preferably reflects existing inventory of unsold products.

In use, if a consumer has any reason to believe that the product, such as watch 18 or garment 22, may not be a bona fide or legitimate product the consumer can examine the hang tag 12. By using a transparent pouch, envelope or carrier 12 a first level of authentication can be effected by examining both sides of the currency bill 14. If the currency bill is a counterfeit such can frequently be determined or uncovered by close examination since inks may not be the right color or may run or the currency bill may not have the appropriate watermarks, etc. The hang tag 10 may also be placed under U.V. light or otherwise examined by currency checking devices of the type typically used by banks and retailers. However, even if the currency bill is a legitimate currency bill, the product to which it is attached may still not be a legitimate product, since a manufacturer of knock-off products may attach a legitimate or bona fide currency bill to a counterfeit product. Now, the consumer can check the hang tag 10 at a consumer station 28 at a point of sale, and enter the serial number into the keyboard 32. By sending this information to the authentication center 40 an almost immediate response can be received either verifying that the currency bill 14 is attached to an authentic or legitimate product or it is not. This system and method, therefore, can provide a consumer a high level of assurance and comfort that a high-priced ticket item is, in fact, legitimate or bona fide.

Figure 5:
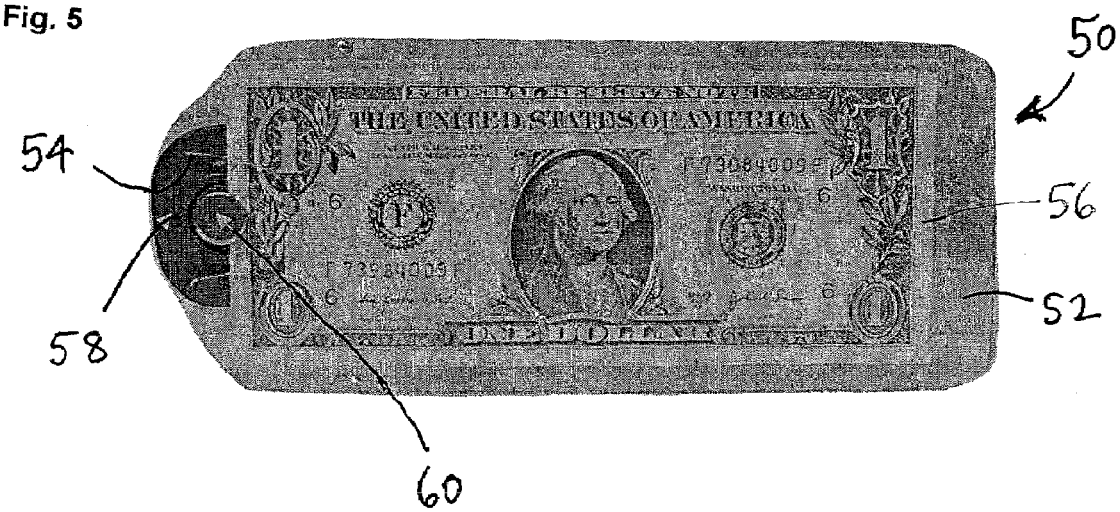
FIG. 5 is a front elevational view of a hang tag similar to the one shown in FIG. 1 combined with a security tag to provide both product authentication and anti-theft features.
Figure 6:
FIG. 6 is a rear elevational view of the security hang tag shown in FIG. 5.

Referring to FIGS. 5 and 6, a combination authentication and security device 50 is illustrated which includes a carrier or pouch 52. The pouch 52 is generally closed about its entire periphery except at one end 54 where the pouch is open. An article of currency, in the form of a U.S. one dollar bill 56, is shown contained within the carrier 52. A security tag 58 is provide at the open end 54 and mounted on the carrier 52 so that the dollar bill or treasury note contained within the carrier can only be removed when the security pin 60 is removed from the embedded security tag. Once a product to which the authentication device, in the form of a tag 50 has been sold and the security tag 58 has been removed the article of currency can be removed. As suggested, authentication of the article can be performed both before a product is purchased or after it is purchased. In both cases, the serial numbers unique to the embedded articles of currency are visible and can be used with the authentication system described in connection with FIG. 4.

Figure 7:
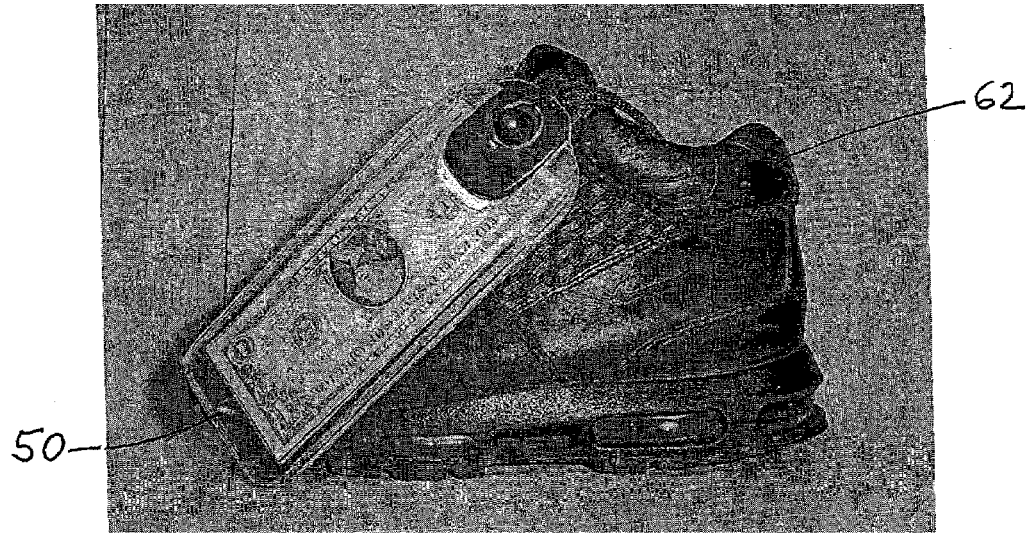
FIG. 7 is a side elevational view with the security hang tag shown in FIGS. 5 and 6 attached to a sneaker.
Figure 8:
FIG. 8 is similar to FIG. 7 showing the security hang tag attached to a bag.

Referring to FIGS. 7 and 8, the combination authentication and security tag 50 is shown attached to a pair of sneakers 62, while a similar tag is shown attached on FIG. 8 to an expensive bag 64.

Although the present invention has been described in some detail by way of illustration and example for purposes of clarity and understanding, it will, of course, be understood that various changes and modifications may be made in the form, details, and arrangements of the parts without departing from the scope of the invention.

The invention claimed is:

1. A product authentification system comprising a paper currency receiving carrier;
   an article of currency contained within said carrier and bearing a unique serial number identifying said specific article of currency;
   attachment means for attaching said carrier to a product the authenticity of which may need to be verified, said carrier being at least partially transparent to expose said unique serial number; and
   verification means for entering alphanumeric characters representing said serial number and including a data base containing an inventory of serial numbers representing authentic articles or products to which carriers with unique articles of currency have been attached, and further including means for comparing entered alphanumeric characters with serial numbers contained in said data base, and output means for providing an indication of authenticity only when said entered alphanumeric characters correspond to a serial number stored in said data base.

2. A product authentification system as defined in claim 1, wherein said carrier includes juxtaposed flat panels or surfaces spaced from each other to create a clearance therebetween sufficient to receive said article of currency.

3. A product authentification system as defined in claim 2, wherein said panels are transparent to render both sides of said article of currency visible.

4. A product authentification system as defined in claim 1, wherein said carrier is sealed to normally protect said article of currency and prevent said article of currency from being removed from said carrier, replaced or tampered with prior to purchase of the product to which said carrier is attached.

5. A product authentification system as defined in claim 1, wherein said attachment means comprises a tie or filament.

6. A product authentification system as defined in claim 1, wherein said verification means comprises a stand alone unit including said data entry means, data base, means for comparing and output means, whereby a user such as a consumer contemplating purchase if a product can verify its authenticity without the need for any communications to a remote location.

7. A product authentification system as defined in claim 1, wherein said verification means comprises at least one consumer station including said data entry means and output means, and at least one remote authentication center including said data base and means for comparing;
   and communication means for linking said at least one consumer station with said at least one remote authentication center, whereby numerous consumer stations can be serviced by a fewer number of authentification centers.

8. A product authentification system as defined in claim 7, wherein said communication means includes means for transmitting data over the Internet.

9. A product authentification system as defined in claim 7, wherein each consumer station includes a keyboard for data entry, a CPU, a display for exhibiting results of comparison and indicating whether a given product is authentic.

10. A product authentification system as defined in claim 7, wherein each consumer station is in the form of a kiosk.

11. A product authentification system as defined in claim 7, wherein each consumer station comprises a portable handheld device with Internet access.

12. A product authentification system as defined in claim 11, wherein said device comprises a PDA.

13. A product authentification system as defined in claim 11, wherein said device comprises a cellular phone.

14. A product authentification system as defined in claim 7, wherein said at least one authentication center comprises a database;
   a digital certificate; and
   means to provide a secure communication link.

15. A product authentification system as defined in claim 1, further comprising a security tag mounted on said carrier for providing both anti-theft and authentification features.

16. A method of product authentification comprising the steps of providing a paper currency receiving carrier;
   placing an article of currency within said carrier that bears a unique serial number identifying said specific article of currency;
   attaching said carrier to a product the authenticity of which may need to be verified, said carrier being at least partially transparent to expose said unique serial number;
   comparing alphanumeric characters representing said serial number corresponding to said unique serial number with serial numbers stored in a date base containing an inventory of serial numbers representing authentic articles or products to which carriers with unique articles of currency have been attached; and
   providing an indication of authenticity only when said entered alphanumeric characters correspond to a serial number stored in said data base.

17. Method as defined in claim 16, wherein said step of comparing comprises the steps of entering said alphanumeric characters into an input device at one location; and communicating said data to a remote location for comparison with serial numbers stored in a data base.

18. Method as defined in claim 16, further comprising the steps of updating said data base when a legitimate product attached to a carrier is sold, whereby said data base substantially contains serial numbers of only unsold products or merchandise.

19. A combination authentication and security device comprising a paper currency receiver or carrier that is at least partially transparent to reveal a serial number of an article of currency contained therein, and a security tag attached to said carrier disposed to normally prevent removal of the article of currency from said carrier until a product to which said carrier is attached is sold and said security tag is removed.

20. A combination authentication and security device as defined in claim 19, wherein said article of currency is a U.S. dollar bill.

* * * * *